Patented Oct. 31, 1939

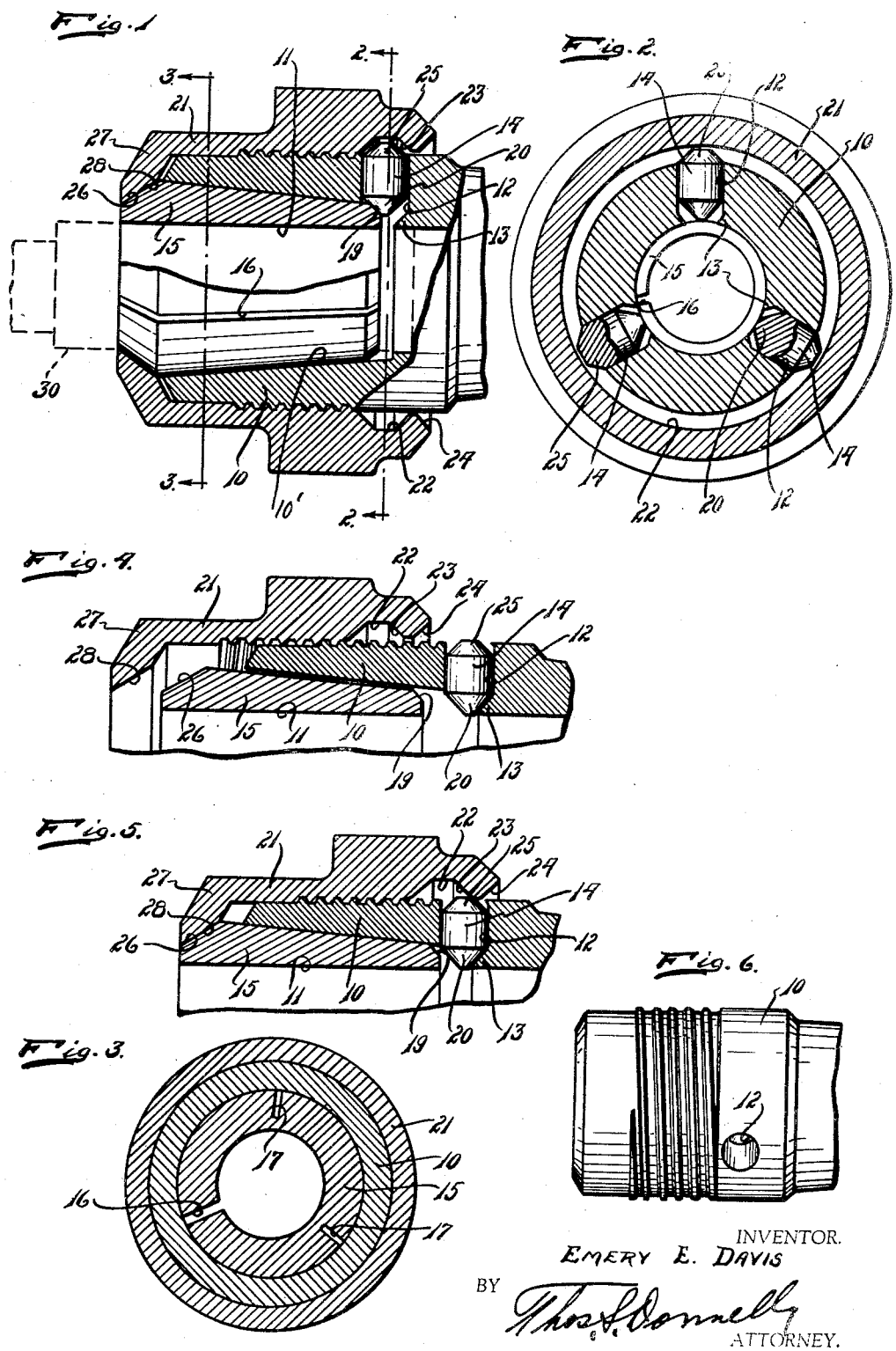

2,177,979

UNITED STATES PATENT OFFICE 2,177,979

CHUCK

Emery E. Davis, Glendale, Calif., assignor to Otto H. Siewek, Ferndale, Mich.

Application July 1, 1938, Serial No. 216,902

6 Claims. (Cl. 279—49)

My invention relates to a new and useful improvement in a chuck used for holding and driving various types of cutting tools having shanks and particularly shanks circular in cross-section.

It is an object of the present invention to provide a chuck of this class so constructed and arranged as to effect a tighter gripping on the tool shank, maintain a true alignment of the tool shank with the driving arbor and effect a concentric operation on the work-piece upon which operated.

Another object of the invention is the provision of the shank so arranged and constructed that a tool shank may be very easily and quickly secured in position and released therefrom.

Other objects will appear hereinafter.

The invention consists in the combination and arrangement of the parts hereinafter described and claimed.

The invention will be best understood by a reference to the accompanying drawing which forms a part of this specification and in which:

Fig. 1 is a longitudinal sectional view of the invention.

Fig. 2 is a sectional view taken on line 2—2 of Fig. 1.

Fig. 3 is a sectional view taken on line 3—3 of Fig. 1.

Fig. 4 is a fragmentary sectional view illustrated in parts in the position of being assembled.

Fig. 5 is a fragmentary sectional view similar to Fig. 4 showing the parts in position of further assembly.

Fig. 6 is a fragmentary side-elevational view of the holder.

As shown in the drawing I provide a holder which may be secured to a rotating arbor and which provides a hollow head 10, having a tapered inner surface 10'. The periphery of this head 10 is threaded and formed in the head at the rear of the head is a plurality of circumferentially spaced openings 12, these openings being uniformly distributed about the center of the head 10 so that a rotative balance of the head may be maintained. The openings 12 terminate at their inner ends on a shoulder 13 and positioned in each of these openings 12 is a loose radially movable plug 14 having its opposite ends tapered.

A gripping bushing or collet 15 having a periphery taper corresponding substantially to the taper of the surface 10' is insertable in the head 10. This bushing or collet 15 has a cylindrical bore 11 formed therethrough. This collet or bushing 15 is provided with an axially extending radially directing slot 16 and with axially extending grooves 17 formed in its periphery, the construction being such that the collet or bushing 15 may be sprung inwardly to smaller dimensions, this collet or bushing 15 being formed from several resilient material for this purpose. The periphery of the inner end or the tapered end collet or bushing 15 is cut away to provide the inclined inner-end surface 19 and a similar cutting away of the outer end is effected to provide the inclined outer surface 26. The incline of the surface 19 corresponds to the inclined surface end 20 of the plug 14 as does likewise the inclined surface of the shoulder 13. This shoulder prevents the plug 14 from falling inwardly through the openings 12 when placed therein.

A collar 21 is threadable onto head 10. This collar 21, having adjacent at its rear or inner end, a groove 22 formed in inner surface, one side of said groove having the inclined face 23 and the collar 21 terminating in an inclined end face 24 corresponding to the incline of the end surface 25 on the plug 14. The collar 21 is provided on its outer end with an inwardly directed flange 27 terminating in a tapered surface 28 corresponding in angularity to the tapered surface 26.

The device is used for retaining a tool 30 in position, this tool 30 being formed circular in cross-section. In securing the tool 30 on the holder, the tool 30 should be inserted in the bushing or collet 15 and this should be inserted in the head 10 as shown in Fig. 4. The collar 21 would then be threaded on the head 10 and as it threads on the head 10, the inclined surface 23 of the flange 27 would engage the inclined end surface 26 of collet or bushing 15 and force the same inwardly of the head 10. The outside diameter of the collet or bushing 15 is slightly larger than the inside diameter of head 10 so that as the collet or bushing 15 moves inwardly in the head 10, the bushing or collet 15 would be sprung into clamping engagement with the tool 30 and serve to securely grip it. As the threading of the collar 21 is proceeded with, the surface 24 would engage the end surface 25 of the plugs 14 and force these plugs inwardly against the shoulder or seat 13 thus permitting the collar 21 to ride over the plugs 14 and bring the groove or recess 22 into registration with these plugs 14. As the groove 22 moves into registration with plugs 14, the inclined surface 19 of the bushing or collet 15 would engage the inner end surface 20 of the plugs 14 and force them outwardly into the recess or groove 22 as shown in Fig. 1 and when this stage is arrived at, the butt of the tool 30 would be securely clamped in position. It will be noted that the periphery of the bushing or collet 15 is engaged throughout its length with the inclined surface 10', thus presenting maximum area of contact for effecting the squeezing operation on the collet or bushing and thus producing a maximum gripping thrust on the tool shank or butt engaged by the collet or bushing 15. It is believed obvious that the size of the crossing threads on the head and collar 21 may be varied to suit various conditions. It is also believed obvious that the tapered surface 10' and the tapered periphery of the collet or bushing 15 may be varied to suit different conditions. By having this pressure exerted uniformly circumferentially to the bushing or collet 15 a proper and true alignment of the tool in the head 10 is effected. By having the plugs 14 uniformly distributed circumferentially, the rotative balance of the head 10 is not destroyed.

One of the difficulties of a holder of this class is the removal of the tool therefrom when it is desired to change the tool. With the present invention, when it is desired to remove the tool, it is but necessary to unthread the collar 21 from the head 10. As this unthreading operation proceeds, the inclined surface 23 will engage the inclined end surface 25 of the plugs 14 and force the same radially inwardly. As these plugs move radially inwardly, the inclined inner end surface 20 of the plugs 14 will, through their engagement with the inner inclined end surface 19 of the collet or bushing 15, force this collet or bushing axially outwardly so that the automatic removal of the tool is effected upon the unthreading of the collar 21.

It is believed obvious that with the same head and collar various bushings 15 may be used for different sized bores 11 so that this head provides a maximum range of use.

The efficiency and compactness of the device will appear obvious.

While I have illustrated and described the preferred form of construction I do not wish to limit myself to the precise details of structure shown but desire to avail myself of such variations and modifications as come within the scope of the appended claims.

Having thus described my invention what I claim as new is:

1. A device of the class described comprising a holder having a tapered bore formed in one end thereof and provided with an opening extending from its periphery into said bore; a split tapered bushing inserted into said bore, the forcing of said bushing inwardly of said bore effecting a contraction of said bushing for clamping a tool inserted therein; a member threaded on said holder and movable axially thereof upon being rotated relatively thereto; a thrust member mounted in said opening and engageable with the inner end of said bushing and adapted of threading upon said threaded member in one direction for moving inwardly of said opening against the inner end of said bushing and forcing the same outwardly of said bore.

2. A device of the class described comprising a holder having a tapered bore formed in one end thereof; a tapered split bushing insertable into said bore, said bushing upon movement inwardly into said bore being compressed for inserting a tool therein, said holder having openings extending from its periphery into said bore; a thrust member slidably mounted in each of said openings and having curvilinear surface on opposite ends and engageable on its inner end with the inner end of said bushing and adapted upon being thrust inwardly while in engagement with the inner end of said bushing for forcing said bushing outwardly into said bore; and means rotatably mounted on and axially movable of said holder for engaging the outer side of said thrust members and forcing the same inwardly for effecting movement of said bushing outwardly of said bore.

3. A device of the class described comprising a holder having a tapered bore at one end and provided with a plurality of circumferentially spaced openings communicating with said bore; a thrust member loosely positioned in each of said openings, and having curvilinear opposite ends; a split tapered bushing insertable into said bore, the taper on said bushing coinciding with the taper of said bore, said bushing being slightly larger in diameter than said bore and being compressed upon movement inwardly into said bore for clamping a tool in said bushing, the inner end of said bushing, upon being thrust fully into said bore, moving said thrust members outwardly; a collar threadable on said end of said holder and having on its inner surface adjacent its inner end a groove for accommodating the outwardly projecting portions of said thrust members, said groove having an inclined surface on its rear side adapted upon the unthreading of said collar for engaging said thrust members and thrusting the same inwardly for effecting a movement of said bushing outwardly of said bore.

4. A device of the class described comprising a holder having a tapered bore at one end and provided with a plurality of circumferentially spaced openings communicating with said bore; a thrust member loosely positioned in each of said openings, and having curvilinear opposite ends; a split tapered bushing insertable into said bore, the taper on said bushing coinciding with the taper of said bore, said bushing being slightly larger in diameter than said bore and being compressed upon movement inwardly in said bore for clamping a tool into said bushing, the inner end of said bushing, upon being thrust fully into said bore, moving said thrust members outwardly; a collar threadable on said end of said holder and having on its inner surface, adjacent its inner end, a groove for accommodating the outwardly projecting portions of said thrust members, said groove having an inclined surface on its rear side adapted upon the unthreading of said collar for engaging said thrust members and thrusting the same inwardly for effecting a movement of said bushing outwardly of said bore; and means on said collar, engageable with the forward end of said bushing and adapted upon the threading of said collar onto said holder, for forcing said bushing inwardly of said bore.

5. A device of the class described comprising a holder having a tapered bore at one end and provided with a plurality of circumferentially spaced openings communicating with said bore; a shoulder overlying the inner end of said openings; a thrust member loosely positioned in each of said openings and engageable with said shoulder, said shoulder limiting the movement of said thrust member inwardly of said bore, said thrust members having curvilinear spaced sides; a split bushing having a tapered periphery corresponding substantially to the taper of said bore, and insertable into said bore, said bushing being of slightly larger dimensions than said bore and compressible, upon movement inwardly of said bore, for clamping a tool inserted into said bushing, the inner end of said bushing having an inclined surface engageable with the curvilinear surface of said thrust members and adapted, upon completion of the inward movement of said bushing relatively to said bore, for forcing said thrust members outwardly to project beyond the periphery of said holder; a collar threadable on said holder and having inclined surfaces, adapted upon engagement with said thrust members, for moving the same inwardly, said collar having on its inner surface adjacent one of its ends a circumferential groove for accommodating said thrust members upon projection of the same outwardly beyond the periphery of said holder, said groove having an inclined surface adapted, upon the unthreading of said collar from said holder, for engaging the curvilinear outer surfaces of said thrust members for forcing the same radially inwardly and effecting movement of said bushing outwardly of said bore.

6. A device of the class described comprising a holder having a tapered bore at one end and provided with a plurality of circumferentially spaced openings communicating with said bore; a shoulder overlying the inner end of said openings; a thrust member loosely positioned in each of said openings and engageable with said shoulder, said shoulder limiting the movement of said thrust member inwardly of said bore, said thrust members having curvilinear spaced sides; a split bushing having a tapered periphery corresponding substantially to the taper of said bore and insertable into said bore said bushing being of slightly larger dimensions than said bore and compressible upon movement inwardly of said bore for clamping a tool inserted into said bushing, the inner end of said bushing having an inclined surface engageable with the curvilinear surface of said thrust members and adapted, upon completion of the inward movement of said bushing relatively to said bore, for forcing said thrust members outwardly to project beyond the periphery of said holder; a collar threadable on said holder and having inclined surfaces adapted upon engagement with said thrust members, for moving the same inwardly, said collar having one its inner surface adjacent on end a circumferential groove for accommodating said thrust members upon projection of the same outwardly beyond the periphery of said holder, said groove having an inclined surface adapted, upon the unthreading of said collar from said holder for engaging the curvilinear outer surfaces of said thrust members for forcing the same radially inwardly and effecting movement of said bushing outwardly of said bore; and an engagement means carried by said collar and engageable with the outer end of said bushing and, upon threading of said collar on said holder, effecting movement of said bushing inwardly of said bore.

EMERY E. DAVIS.